Patented Mar. 17, 1970

3,501,508
STEROIDAL ADAMANTATES
Arvin Pranlal Shroff, Piscataway, N.J., assignor to Ortho Pharmaceutical Corporation, a corporation of New Jersey
No Drawing. Filed Jan. 12, 1967, Ser. No. 608,728
Int. Cl. C07c 169/12, 167/128; A61k 17/06
U.S. Cl. 260—397.5
3 Claims

ABSTRACT OF THE DISCLOSURE

The compounds herein are adamantate esters of 17α-ethynyl-19-norandrost-4-en-3-one-17β-ol and its 3-oxime and 3-oxime esters. They are antilittering agents.

---

The present invention relates to adamantate esters of 17α-ethynyl-19-norandrost-4-en-3-one-17β-ol and to the 3-oxime and 3-oxime esters thereof.

In my copending applications, U.S. Ser. No. 502,384 filed Oct. 22, 1965 now abandoned, and U.S. Ser. No. 563,081 filed July 6, 1966 now U.S. Patent No. 3,437,674, there are disclosed a number of oxime esters of 19-norandrostene.

The compounds of the present invention have the general formula:

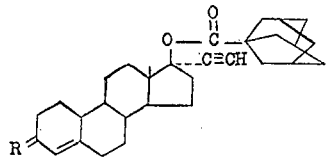

wherein R is oxygen or NOR′, wherein R′ is hydrogen or lower acyl.

The compounds of the invention when given subcutaneously possess long-lasting antilittering activity, but they are neither progestational nor anti-ovulatory agents.

EXAMPLE I

17α-ethynyl-19-norandrost-4-en-3-one-17β-ol-adamantate

A solution containing 0.3 gm. of adamantane-1-carboxylic acid, 10.0 ml. of dry benzene and 0.6 ml. of thionyl chloride is refluxed for four hours. The benzene and thionyl chloride are removed under reduced pressure. The residue is dissolved in 20 ml. of dry benzene and is treated with 447 mg. of 17α-ethynyl-19-norandrost-4-en-3-one-17β-ol. The mixture is refluxed for twenty hours and the crude product is chromatographed on silicic acid. 17α-ethynyl-19-norandrost-4-en-3-one-17β-ol adamantate is recrystallized from ethyl ether. M.P. 214–216° C.

$\lambda_{max.}^{EtoH}$ 240 mμ

Calcd. for $C_{31}H_{40}O_3$ (percent): C, 80.83; H, 8.75. Found (percent): C, 81.06; H, 8.81.

EXAMPLE II

17α-ethynyl-17β-adamantoxy-19-norandrost-4-en-3-one oxime

A mixture containing 1.0 gm. of 17α-ethynyl-19-norandrost-4-en-3-one-17β-ol adamantate as prepared by the method of Example I, 1.0 gm. of hydroxylamine hydrochloride and 20 ml. of pyridine is heated on a steam bath for one-half hour. It is cooled and poured over an excess of ice and water. The precipitates thus formed are collected by filtration and recrystallized from methyl alcohol to yield 17α-ethynyl-17β-adamantoxy - 19-norandrost-4-en-3-one oxime having a melting point of 191–193° C.

$\lambda_{max.}^{EtoH}$ 239 mμ

Calcd. for $C_{31}H_{41}NO_3 \cdot 1 O.5H_2O$ (percent): C, 76.85; H, 8.74; N, 2.90; O, 12.02. Found (percent): C, 76.62; H, 8.77; N, 2.97; O, 11.87.

17α-ethynyl - 17β-adamantoxy - 19-norandrost-4-en-3-one oxime, prepared by the method of Example II may be converted to an oxime ester by esterifying the oxime with an appropriate acid anhydride, such as acetic anhydride, propionic anhydride, n-valeric anhydride, caprylic anhydride, benzoic acid anhydride, salicyclic acid anhydride, etc.

The compounds of the invention are antilittering agents, with long-lasting effectiveness when given subcutaneously. The compounds are tested by the following procedure:

Female rats of known fertility are injected once subcutaneously with the compound under test in sesame oil. Seven days after the injection, the female rats are cohabited with male rats until pregnancy occurs.

EXAMPLE III

Ten female rats were injected subcutaneously one with 6.4 mg./kg. of body weight of 17α-ethynyl-19-nor-4-androsten-17β-ol-3-one adamantate. Seven days after injection, the female rats were cohabited with 4 male rats. All females became pregnant 55 days following first cohabitation.

EXAMPLE IV

Ten female rats were injected subcutaneously once with 30 mg./kg. of body weight of 17α-ethynyl-19-nor-4-androsten-17β-adamantate-3-oxime. Seven days after injection, the female rats were cohabited with 4 male rats. All females became pregnant 54 days following first cohabitation.

Upon increasing the dose to 60 mg./kg. of body weight, 88 days of cohabitation elapsed before pregnancy occurred.

What is claimed is:
1. A compound of the formula

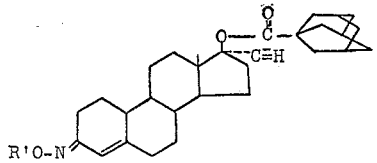

wherein R′ is selected from the group consisting of hydrogen and a lower hydrocarbon carboxylic acyl group.

2. 17α-ethynyl - 17β - adamantoxy-19-norandrost-4-en-3-one oxime according to claim 1.

3. N-acetoxy-17α-ethynyl - 17β - adamantoxy-19-norandrost-4-en-3-one oxime according to claim 1.

References Cited

UNITED STATES PATENTS

| | | | |
|---|---|---|---|
| 3,074,979 | 1/1963 | Poos et al. | 260—397.45 |
| 3,299,107 | 1/1967 | Mazur | 260—397.5 |
| 3,338,925 | 8/1967 | Fried | 260—397.4 |
| 3,301,880 | 1/1967 | Vliet | 260—397.5 |
| 3,373,157 | 3/1968 | Georgian et al. | 260—239.55 |

FOREIGN PATENTS 593,087  2/1960  Canada.

LEWIS GOTTS, Primary Examiner
ETHEL G. LOVE, Assistant Examiner

U.S. Cl. X.R.
260—397.4; 424—238, 243